(12) United States Patent
Tanno

(10) Patent No.: US 7,581,577 B2
(45) Date of Patent: *Sep. 1, 2009

(54) LOW NOISE PNEUMATIC TIRE

(75) Inventor: Atsushi Tanno, Hiratsuka (JP)

(73) Assignees: The Yokohama Rubber Co., Ltd., Tokyo (JP); Mitsubishi Jidosha Kogyo Kabushiki Kaisha, Tokyo (JP)

( * ) Notice: Subject to any disclaimer, the term of this patent is extended or adjusted under 35 U.S.C. 154(b) by 260 days.

This patent is subject to a terminal disclaimer.

(21) Appl. No.: 10/563,673

(22) PCT Filed: Aug. 4, 2004

(86) PCT No.: PCT/JP2004/011137

§ 371 (c)(1),
(2), (4) Date: Jan. 6, 2006

(87) PCT Pub. No.: WO2005/012007

PCT Pub. Date: Feb. 10, 2005

(65) Prior Publication Data

US 2006/0231185 A1     Oct. 19, 2006

(30) Foreign Application Priority Data

Aug. 4, 2003    (JP) .............................. 2003-285808

(51) Int. Cl.
*B60C 5/00*      (2006.01)
*B60C 5/12*      (2006.01)

(52) U.S. Cl. .................... 152/450; 152/155; 152/157; 152/158

(58) Field of Classification Search ................ 152/155, 152/157, 158, 450
See application file for complete search history.

(56) References Cited

U.S. PATENT DOCUMENTS 7,140,412 B2 * 11/2006 Tanno ................. 152/450
7,387,141 B2 *  6/2008 Tanno et al. ............. 152/155

FOREIGN PATENT DOCUMENTS

| EP | 1253025 | * 10/2002 |
|----|---------|-----------|
| GB | 2146959 | *  5/1985 |
| JP | 62-216803 |  9/1987 |
| JP | 09-086113 |  3/1997 |
| JP | 2000-062408 | 2/2000 |
| JP | 2000314453 | * 11/2000 |
| JP | 2003-048407 | 2/2003 |
| JP | 2003-226104 A | 8/2003 |
| JP | 2004-291855 | 10/2004 |

OTHER PUBLICATIONS

International Search Report. Nov. 9, 2004.

* cited by examiner

*Primary Examiner*—Justin Fischer
(74) *Attorney, Agent, or Firm*—Greer, Burns & Crain, Ltd.

(57) ABSTRACT

A low noise pneumatic tire according to the present invention includes a belt-shaped sound absorbing member mounted on the radially inner surface of the tread by a fixing elastic band, the belt-shaped sound absorbing member being formed of a porous material. The belt-shaped sound absorbing member has a width ranged from 40% to 90% of the maximum width of the tire, and a thickness ranged from 5 mm to 50 mm.

10 Claims, 5 Drawing Sheets

LOW NOISE PNEUMATIC TIRE

TECHNICAL FIELD

The present invention relates to low noise pneumatic tires, and more particularly, to a low noise pneumatic tire which can effectively reduce noise created by acoustic cavity resonance.

TECHNICAL BACKGROUND

There is acoustic cavity resonance produced by vibration of air with which the cavity of a tire is charged, which is one of the sources that create tire noise. The tread of a tire, which comes into contact with a road surface during running of a vehicle, vibrates due to unevenness of the road surface, and this vibration then causes the vibration of air in the cavity of the tire, thereby producing the cavity resonance. It is known that the frequency of sound caught as noise in the cavity resonance is generally about 200 Hz to 300 Hz, differing according to tire sizes. It is thus important to decrease the level of noise in this frequency band in order to reduce tire noise.

As an approach for reducing noise created by such acoustic cavity resonance, it has been proposed to add a sound absorbing member in the cavity of a tire to absorb the resonance sound (see Unexamined Japanese Patent Application Publication No. 62-216803, for example). However, in the case where the sound absorbing member is mounted on the inner surface of a tire with an adhesive or the like, because the member different from the tire is added inside the tire, stress is concentrated on the adhesive interface due to deformation of the tire during rotation of the tire, which often separates the sound absorbing member. Accordingly, there remain a lot of problems associated with how to mount the sound absorbing member thereon.

Attempts have been made to reduce the cavity resonance sound by constantly varying the frequency of resonance with revolving of a wheel by changing the cross-sectional shape of the cavity of a tire circumferentially of the tire. However, these attempts cause deterioration of mounting of the tire on a rim, or need modifications to production facilities or the like to a large extent because the structure of the tire or rim is modified.

DISCLOSURE OF THE INVENTION

An object of the present invention is to provide a low noise pneumatic tire which can solve a problem with a sound absorbing member mounted thereon without any modifications to production facilities or the like for tires and rims.

In order to achieve the above object, a low noise pneumatic tire according to the present invention has a tread, the tread having a radially inner surface, a belt-shaped sound absorbing member being mounted on the radially inner surface of the tread by a fixing elastic band, the belt-shaped sound absorbing member being formed of a porous material and having a width of 40% to 90% of a maximum width of the tire and a thickness of 5 mm to 50 mm.

As described above, the tire-widthwise length and thickness of the belt-shaped sound absorbing member are suitably adjusted, and the belt-shaped sound absorbing member is mounted on the radially inner surface of the tread by the fixing elastic band, using the elastic force thereof, so the belt-shaped sound absorbing member can be mounted thereon without incurring a problem such as easy separation or damage.

Since the belt-shaped sound absorbing member and fixing elastic band are mounted on the tire after a curing process, there is no need to modify production facilities or the like for tires and rims.

The belt-shaped sound absorbing member and fixing elastic band are mounted on the radially inner surface of the tread, so the mounting operation of the tire on a rim is not obstructed.

Another low noise pneumatic tire according to the present invention has a tread, the tread having a radially inner surface, a belt-shaped sound absorbing member being mounted on the radially inner surface of the tread by a fixing elastic band, the belt-shaped sound absorbing member being formed of a porous material, the belt-shaped sound absorbing member being formed in a curved manner widthwisely and/or longitudinally thereof so as to have a shape extending along the radially inner surface of the tread.

As described above, since the belt-shaped sound absorbing member itself is formed in the curved manner corresponding to the radially inner surface of the tread, the belt-shaped sound absorbing member can fit the radially inner surface of the tread with nearly no gaps therebetween. Therefore, the belt-shaped sound absorbing member can be mounted on the radially inner surface of the tread by the fixing elastic band, using the elastic force thereof, without incurring a problem such as easy separation or damage. There is no need to modify production facilities or the like for tires and rims, and the mounting operation of the tire on a rim is not obstructed.

Still another low noise pneumatic tire according to the present invention has a tread, the tread having a radially inner surface, a belt-shaped sound absorbing member being mounted on the radially inner surface of the tread by a fixing elastic band, the belt-shaped sound absorbing member being formed of a porous material and having a radially inner surface and a radially outer surface, at least one of the radially inner and outer surfaces of the belt-shaped sound absorbing member having notches that extend widthwisely of the belt-shaped sound absorbing member and are disposed at prescribed intervals longitudinally of the belt-shaped sound absorbing member.

As described above, the notches are formed in at least one of the radially inner and outer surfaces of the belt-shaped sound absorbing member to facilitate bending it, resulting in that the belt-shaped sound absorbing member can easily follow the radially inner surface of the tread. Accordingly, the belt-shaped sound absorbing member can be mounted on the radially inner surface of the tread by the fixing elastic band, using the elastic force thereof, without incurring a problem such as easy separation or damage. There is no need to modify production facilities or the like for tires and rims, and the mounting operation of the tire on a rim is not obstructed.

BEST MODES FOR CARRYING OUT THE INVENTION

Embodiments of the present invention will be described in detail below with reference to the attached drawings. Like characters refer to like elements throughout the drawings, and duplicate descriptions will be omitted.

Figure 1:
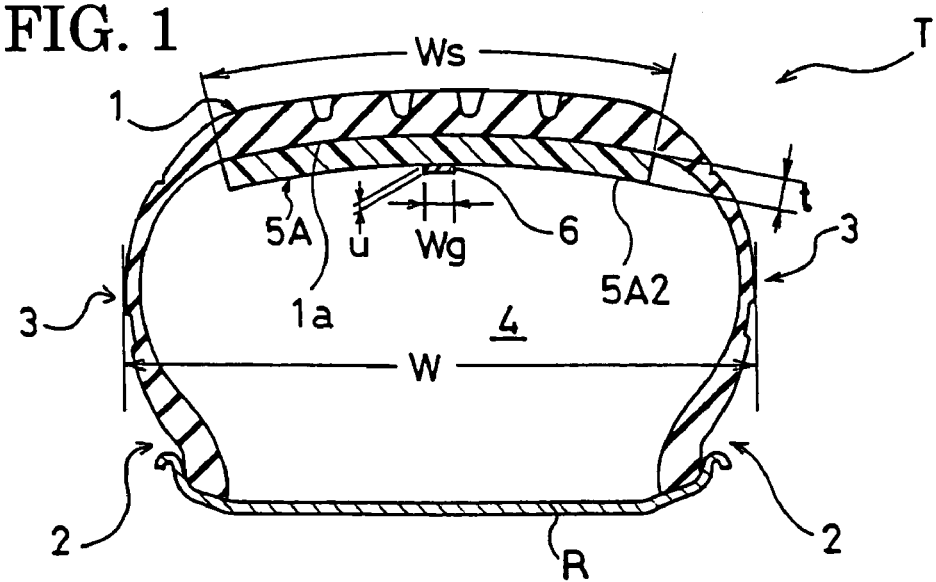
FIG. 1 is a cross-sectional view showing a low noise pneumatic tire according to an embodiment of the present invention in a state where the tire is mounted on a rim and air pressure is applied thereto, taken in a plane that contains the axis of rotation of the tire.

Referring to FIG. 1, the pneumatic tire T includes a tread 1, right and left beads 2, and right and left sidewalls 3 connecting the tread 1 and the beads 2. The tire has a cavity 4 for being charged with air inside. Reference character R denotes a rim on which the pneumatic tire T has been mounted. Although not shown in the drawing, a carcass ply extends between the right and left beads 2 in the tire. A plurality of belt plies are disposed radially outwardly of the carcass ply in the tread 1. A bead core is embedded in each of the right and left beads 2, and the opposing ends of the carcass ply are turned up around the bead cores from the inner side of the tire towards the outer side thereof.

The tread 1 has a radially inner surface 1a in the form of a curved surface having a prescribed radius of curvature, and a belt-shaped sound absorbing member 5A is mounted on the radially inner surface 1a around the entire circumference thereof by pressing of a fixing elastic band 6, using the elastic force thereof, whereby the belt-shaped sound absorbing member 5A does not easily separates from the radially inner surface 1a of the tread 1. The belt-shaped sound absorbing member 5A is formed of a porous material having a low density, and the fixing elastic band is formed of a synthetic resin having a high tensile modulus of elasticity The belt-shaped sound absorbing member 5A has a width Ws, measured in parallel to the radially inner surface 1a, of 40% to 90% of the maximum width W of the tire, and a thickness t in the range of 5 mm to 50 mm. The tire maximum width W referred here is, in the case of a pneumatic tire for passenger cars, the maximum width of the tire when the tire is mounted on a standard rim defined by JATMA (year 2003), and an air pressure of 180 kPa is applied thereto; in the case of a pneumatic tire other than a pneumatic tire for passenger cars such as a heavy duty pneumatic tire, it is the maximum width of the tire when the tire is mounted on a standard rim defined by JATMA (year 2003), and an air pressure corresponding to the maximum load capability written in JATMA (year 2003) is applied thereto.

If the width Ws of the belt-shaped sound absorbing member 5A exceeds 90% of the tire maximum width W, the widthwise opposing ends of the belt-shaped sound absorbing member 5A excessively deform when mounted on the radially inner surface of the tread 1, so the opposing ends are subject to damage. If the width Ws of the belt-shaped sound absorbing member 5A is less than 40% of the tire maximum width W, when the belt-shaped sound absorbing member 5A is mounted on the radially inner surface 1a of the tread 1 by pressing of the fixing elastic band 6, the width of the belt-shaped sound absorbing member 5A in contact with the radially inner surface 1a is so narrow that the belt-shaped sound absorbing member 5A is displaced from the attachment position during running, making it difficult to stably mount the belt-shaped sound absorbing member 5A. Also, a noise reduction effect is degraded.

If the thickness t of the belt-shaped sound absorbing member 5A is greater than 50 mm, the thickness of the belt-shaped sound absorbing member 5A is so thick that it is subject to damage due to repeated deformation caused when the tire engages the ground. If the thickness t of the belt-shaped sound absorbing member 5A is less than 5 mm, the belt-shaped sound absorbing member is so thin that it can not provide a sufficient noise reduction effect and is subject to damage due to repeated deformation caused when the tire engages the ground. The thickness t of the belt-shaped sound absorbing member 5A is preferably 10 mm to 30 mm.

As described above, since the width Ws and thickness t of the belt-shaped sound absorbing member 5A are suitably adjusted, and the belt-shaped sound absorbing member 5A is mounted on the radially inner surface 1a of the tread 1 by the fixing elastic band 6, using the elastic force thereof, the belt-shaped sound absorbing member 5A can be mounted without incurring a problem such as easy separation or damage.

The belt-shaped sound absorbing member 5A and fixing elastic band 6 are mounted on the tire T after a curing process, so there is no need to modify production facilities or the like for tires and rims.

Because the belt-shaped sound absorbing member 5A and fixing elastic band 6 are mounted on the radially inner surface 1a of the tread 1, the mounting operation of the tire on a rim is not obstructed.

In the embodiment shown in FIG. 1, the belt-shaped sound absorbing member 5A is mounted on the radially inner surface 1a of the tread 1 around the entire circumference, but may be one having a prescribed length that is shorter than the entire circumferential length of the radially inner surface 1a. When one belt-shaped sound absorbing member 5A having the prescribed length shorter than the entire circumferential length of the radially inner surface 1a is placed, in order to obtain a good noise reduction effect, the longitudinal length (length parallel to the tire circumferential direction) of the belt-shaped sound absorbing member is equal to or greater than 30% of the entire circumferential length of the radially inner surface 1a of the tread 1, and preferably equal to or greater than 40%. When a plurality of belt-shaped sound absorbing members 5A each having the prescribed length shorter than the entire circumferential length of the radially inner surface 1a are placed at predetermined intervals, the total length of the longitudinal lengths of the plurality of belt-shaped sound absorbing members 5A is equal to or greater than 30% of the entire circumferential length of the radially inner surface 1a of the tread 1, and preferably equal to or greater than 40%. The same goes for belt-shaped sound absorbing members described below.

The fixing elastic band 6 is placed on the radially inner side of the belt-shaped sound absorbing member 5A in FIG. 1; however, the fixing elastic band 6 may be secured to the radially outer surface of the belt-shaped sound absorbing member 5A and placed on the radially outer side.

Figure 2:
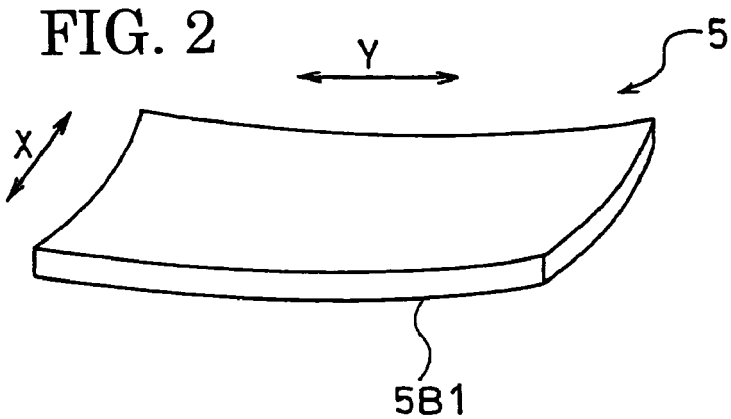
FIG. 2 is a perspective view showing another example of a belt-shaped sound absorbing member used for a low noise pneumatic tire according to the present invention.

Referring to FIG. 2, there is shown another example of the belt-shaped sound absorbing member used for a low noise pneumatic tire according to the present invention. This belt-shaped sound absorbing member 5B is formed in a curved manner in the widthwise direction X and the longitudinal direction Y so as to have a shape extending along the radially-inner surface 1a of the tread 1 in the form of a curved surface having prescribed radii of curvature. The belt-shaped sound absorbing member 5B thus formed in the curved manner is to be mounted on the radially inner surface 1a of the tread 1 by the fixing elastic band 6, as in FIG. 1. The belt-shaped sound absorbing member 5B shown in FIG. 2 is an example that has a prescribed length shorter than the entire circumferential length of the radailly inner surface 1a; however, the belt-shaped sound absorbing member 5B may extend around the entire circumference of the radially inner surface 1a as the belt-shaped sound absorbing member 5a in FIG. 1 does.

The belt-shaped sound absorbing member 5B can fit the radially inner surface 1a with nearly no gaps therebetween, whereby the belt-shaped sound absorbing member 5B can be mounted on the radially inner surface 1a by the fixing elastic band, using the elastic force thereof, without incurring a problem such as easy separation or damage.

There is no need to modify production facilities or the like for tires or rims, and the mounting operation of the tire on a rim is not obstructed.

It is preferable that the belt-shaped sound absorbing member 5B be formed in a curved manner in the widthwise direction X and the longitudinal direction Y, as shown in FIG. 2; however, the belt-shaped sound absorbing member 5B may be formed in the curved manner in any one of the widthwise and longitudinal directions X and Y.

When the belt-shaped sound absorbing member 5B is formed in the curved manner, as described above, the radius S1 of curvature, in the widthwise direction X, of the radially outer surface 5B1 of the belt-shaped sound absorbing member 5B that is formed as a curved surface is preferably 0.7 to 1.3 times longer than the radius of curvature, in the widthwise direction, of the radially inner surface 1a of the tread 1. The radius S2 of curvature, in the longitudinal direction Y, of the radially outer surface 5B1 is also preferably 0.7 to 1.3 times longer than the radius of curvature, in the circumferential direction, of the radially inner surface 1a of the tread 1.

If the curvature radii S1 and S2 of the radially outer surface 5B1 of the belt-shaped sound absorbing member 5B is less than that which is 0.7 times longer than the curvature radii of the radially inner surface 1a of the tread 1, respectively, the opposing ends of the belt-shaped sound absorbing member 5B are not firmly attached to but are lifted from the radially inner surface 1a of the tread 1, whereby, when the tire comes into contact with the ground and is deformed, the opposing ends are chafed against the radially inner surface 1a of the tread 1, and are subject to damage. If the curvature radii S1 and S2 of the radially outer surface 5B1 of the belt-shaped sound absorbing member 5B is greater than that which is 1.3 times longer than the curvature radii of the radially inner surface 1a of the tread 1, respectively, the curvature effect is reduced, whereby the belt-shaped sound absorbing member mounted thereon is subject to problems.

Figure 3:
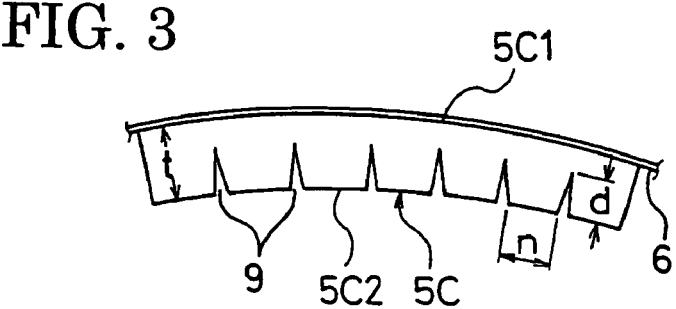
FIG. 3 is a side view showing still another example of the belt-shaped sound absorbing member used for a low noise pneumatic tire according to the present invention in a state where the belt-shaped sound absorbing member is mounted on the radially inner surface of a tread (not shown) by a fixing elastic band.

Referring to FIG. 3, there is shown still another example of the belt-shaped sound absorbing member used for a low noise pneumatic tire according to the present invention. This belt-shaped sound absorbing member 5C is one having a described length that is shorter than the entire circumferential length of the radially inner surface 1a of the tread 1, and the fixing elastic band 6 is placed on the radially outer surface 5C1 of the belt-shaped sound absorbing member 5C. The belt-shaped sound absorbing member 5C includes a radially inner surface 5C2 having a plurality of notches 9 that extend widthwisely of the belt-shaped sound absorbing member 5C and are disposed at prescribed intervals n longitudinally of the belt-shaped sound absorbing member 5C.

As describe above, the plurality of widthwisely extending notches 9 are provides in the radially inner surface 5C2 of the belt-shaped sound absorbing member 5C, whereby the belt-shaped sound absorbing member 5C mounted thereon can easily follow the curved radially inner surface 1a. Therefore, the belt-shaped sound absorbing member 5C can be mounted on the radially inner surface 1a of the tread 1 by the fixing elastic band 6, using the elastic force thereof, without incurring a problem such as easy separation or damage.

There is no need to modify production facilities or the like for tires and rims, and the mounting operation of the tire on a rim is not obstructed.

The notches 9 increase the surface area of the belt-shaped sound absorbing member 5C exposed to the cavity 4, so the sound absorbing effect can be enhanced.

Figure 4:
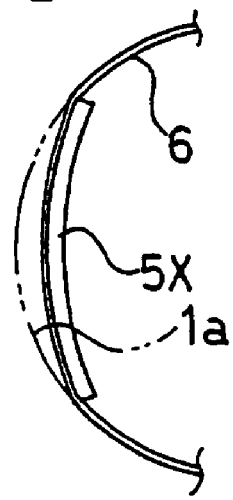
FIG. 4 is a partial side view illustrating an example where the belt-shaped sound absorbing member and fixing elastic member are lifted from the radially inner surface of the tread.

As shown in FIG. 4, in the case where a belt-shaped sound absorbing member 5X with no notches 9 is mounted on the radially inner surface 1a of the tread 1 by the fixing elastic band 6, the belt-shaped sound absorbing member 5X may be lifted from the radially inner surface 1a of the tread 1 together with the fixing elastic band 6 during running if the belt-shaped sound absorbing member 5X is greater in bending stiffness than the fixing elastic band 6. However, since the belt-shaped sound absorbing member 5C of FIG. 3 is easily deformed via the widthwisely extending notches 9, the lifting can be suppressed.

Figure 5:
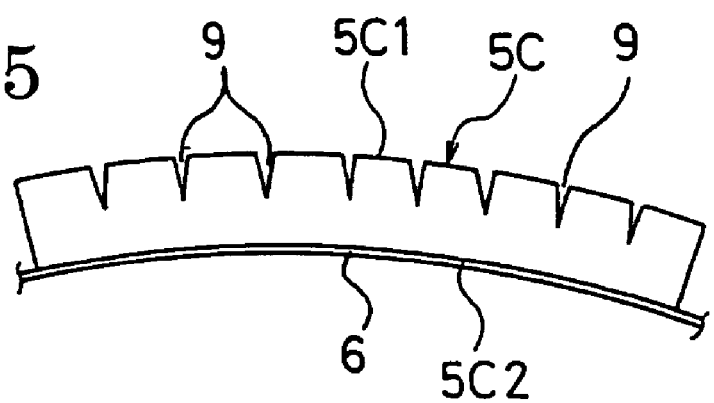
FIG. 5 is a side view showing still another example of the belt-shaped sound absorbing member used for a low noise pneumatic tire according to the present invention in a state where the belt-shaped sound absorbing member is mounted on the radially inner surface of a tread (not shown) by the fixing elastic band.

In FIG. 3, the notches 9 are formed in the radially inner surface 5C2 of the belt-shaped sound absorbing member 5C, but may be formed in the radially outer surface 5C1 of the belt-shaped sound absorbing member 5C, as shown in FIG. 5. In this case, the fixing elastic band 6 is placed on the radially inner surface 5C2 of the belt-shaped sound absorbing member 5C.

Figure 6:
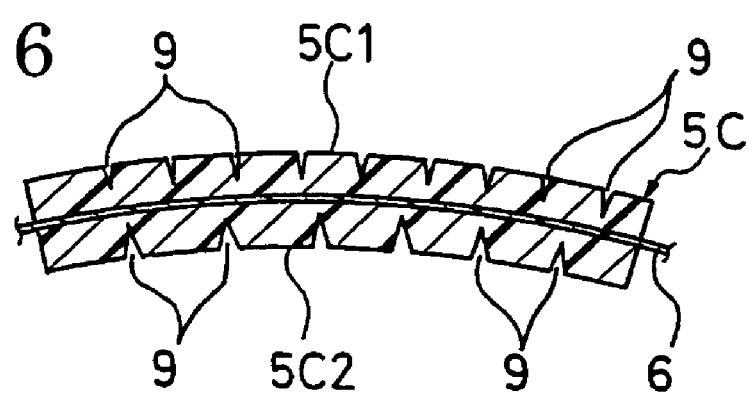
FIG. 6 is a cross-sectional view showing still another example of the belt-shaped sound absorbing member used for a low noise pneumatic tire according to the present invention in a state where the belt-shaped sound absorbing member is mounted on the radially inner surface of a tread (not shown) by the fixing elastic band.

As shown in FIG. 6, the notches 9 may be formed in both of the radially outer surface 5C1 and radially inner surface 5C2 of the belt-shaped sound absorbing member 5C. In this case, the fixing elastic band 6 is placed so as to pass through the belt-shaped sound absorbing member 5C.

Figure 7:
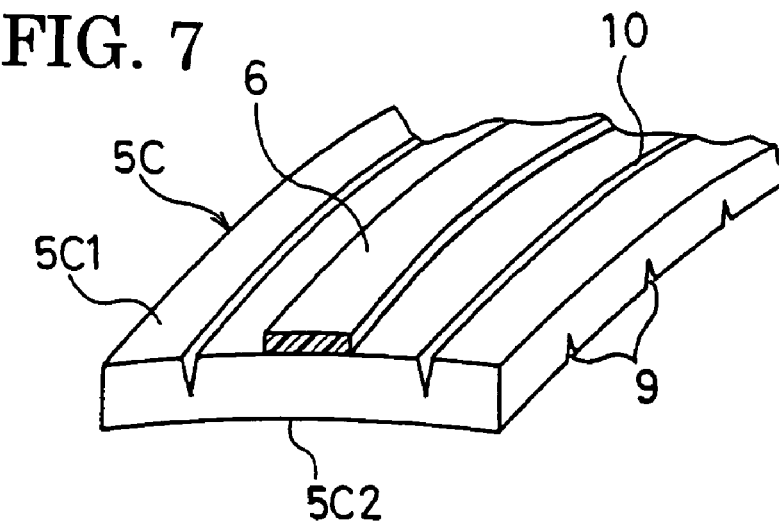
FIG. 7 is a partial perspective view showing still another example of the belt-shaped sound absorbing member used for a low noise pneumatic tire according to the present invention in a state where the belt-shaped sound absorbing member is mounted on the radially inner surface of a tread (not shown) by the fixing elastic band.

As shown in FIG. 7, longitudinally extending notches 10 may be further disposed in the radially outer surface 5C1 of the belt-shaped sound absorbing member 5C having the notches 9 in the radially inner surface 5C2. This also allows for good mounting condition of the belt-shaped sound absorbing member 5C with respect to the radailly inner surface 1a of the tread 1 in the widthwise direction of the tire. If the notches 9 are formed in the radially outer surface 5C1 of the belt-shaped sound absorbing member 5C, the longitudinally extending notches 10 can be formed in the radially inner surface 5C2 of the belt-shaped sound absorbing member 5C.

The depth d of the notches 9 is preferably 20% to 90% of the thickness t of the belt-shaped sound absorbing member 5C. If the depth d of the notches 9 is less than 20% of the thickness t of the belt-shaped sound absorbing member 5C, an effect of the notches 9 formed is reduced; if the depth d of the notches 9 is greater than 90% of the thickness t of the belt-shaped sound absorbing member 5C, when a crack occurs from a top edge of a notch 9, there is a risk that the crack progresses to cut the belt-shaped sound absorbing member 5C.

The longitudinal intervals n of the notches 9 are each preferably 10 mm to 80 mm. These longitudinal intervals n of the notches 9 are more preferably shorter than the ground contact length of the tire not to badly affect the uniformity of the tire.

If the longitudinal intervals n of the notches 9 are less than 10 mm, the intervals of the notches 9 are so narrow that processing tasks are troublesome. If the longitudinal intervals n of the notches 9 exceed 80 mm, it is not preferable because the belt-shaped sound absorbing member 5C does not easily follow the radially inner surface 1a of the tread 1 and the intervals may be longer than the ground contact length of the tire. The longitudinal intervals n of the notches 9 may be equidistant or may not be equidistant.

In the present invention, the porous material of which each belt-shaped sound absorbing member 5A, 5B, 5C is formed is preferably a resin foam, and in particular an urethane foam having a low density. A foamed body formed of the resin foam is preferably made such that adjacent ones of the bubbles of the foamed body communicate with each other to form a continuous bubble. Each belt-shaped sound absorbing member 5A, 5B, 5C may be formed of a woven or non-woven fabric instead of the resin foam.

In the above embodiments, the width of the belt-shaped sound absorbing members 5A, 5B and 5C are constant, but may be varied.

Figure 8:
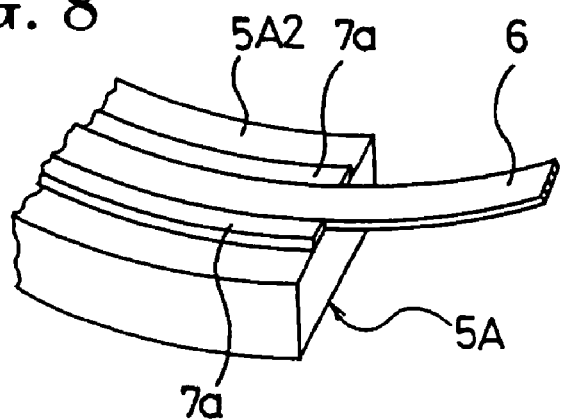
FIG. 8 is a partial perspective view showing another example of a way of attaching the fixing elastic band to the belt-shaped sound absorbing member.
Figure 9:
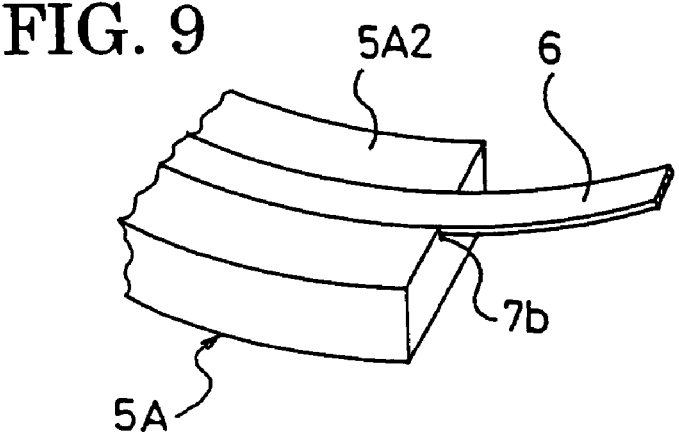
FIG. 9 is a partial perspective view showing still another example of the way of attaching the fixing elastic band to the belt-shaped sound absorbing member.

The fixing elastic band 6 shown in FIG. 1 is placed on the radially inner surface 5A2 of the belt-shaped sound absorbing member 5A, but may be placed between two ridges 7a longitudinally extending on the radially inner surface 5A2 of the belt-shaped sound absorbing member 5A, as shown in FIG. 8. As shown in FIG. 9, a longitudinally extending slot 7b is formed in the radially inner surface 5A2 of the belt-shaped sound absorbing member 5A, and the fixing elastic band 6 may be placed in the slot 7b. The fixing elastic band 6 may be secured to the belt-shaped sound absorbing member 5A with an adhesive or the like as necessary. The same goes for the belt-shaped sound absorbing members 5B and 5C. Also, when the fixing elastic band 6 is attached to the radially outer surface of each belt-shaped sound absorbing member, the same ways can be taken.

The material of which the fixing elastic band 6 is formed preferably includes a synthetic resin such as a polypropylene resin. When the polypropylene resin is used, a polypropylene resin having flexural modulus of elasticity ranged from 1100 MPa to 1800 MPa is preferably used. If the flexural modulus of elasticity is less than 1100 MPa, the elasticity is so low that it is difficult for the fixing elastic band 6 to provide a sufficient function as an elastic band. If the flexural modulus of elasticity exceeds 1800 MPa, the fixing elastic band 6 is so high in stiffness that it is subject to damage, decreasing durability, because the fixing elastic band 6 can not follow deformation caused when the tire engages the ground. More preferably, the flexural modulus of elasticity is 1300 MPa to 1700 MPa. The flexural modulus of elasticity referred here is determined according to the test method for flexural modulus defined by ASTM (AMERICAN SOCIETY FOR TESTING AND MATERIAL).

The width Wg of the fixing elastic band 6 is preferably in the range of 10 mm to 30 mm; the width may be suitably decided according to the stiffness of the fixing elastic band 6 within the range. If the width Wg of the fixing elastic band 6 is less than 10 mm, the fixing elastic band 6 is deficient in strength. If the width Wg of the fixing elastic band 6 is greater than 30 mm, it is not preferable because of an increase in weight.

The thickness u of the fixing elastic band 6 is preferably 0.5 mm to 2.0 mm. If the thickness u of the fixing elastic band 6 is less than 0.5 mm, the fixing elastic band 6 is deficient in strength. If the thickness u of the fixing elastic band 6 is greater than 2.0 mm, the fixing elastic band is so high in bending stiffness that it is subject to damage. More preferably, the thickness u of the fixing elastic band 6 is 0.75 mm to 1.5 mm.

The fixing elastic band 6 can be attached to the radially outer surface or inner surface of each belt-shaped sound absorbing member or to each belt-shaped sound absorbing member so as to pass through the belt-shaped sound absorbing member, as described above; the fixing elastic band 6 may be attached thereto in any ways if the belt-shaped sound absorbing member can be mounted on the radially inner surface 1a of the tread 1 by the fixing elastic band 6.

Figure 10:
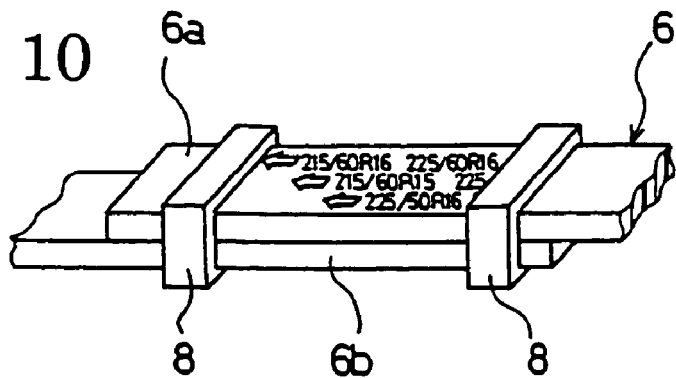
FIG. 10 is a partial perspective view illustrating how to couple the fixing elastic band.

The fixing elastic band 6 may be formed as a circular hoop having a length corresponding to a tire size; however, as shown in FIG. 10, the fixing elastic band 6 is preferably arranged such that the opposing ends 6a and 6b thereof are coupled to each other by coupling bands 8. By changing the coupling position of the opposing ends 6a and 6b, the circumferential length of the circularly coupled fixing elastic band 6 can be modified, thereby applying to different sized tires. More preferably, a plurality of recesses and projections are formed in or on the surfaces of the opposing ends 6a and 6b facing to each other, and the opposing ends 6a and 6b are coupled to each other by the coupling bands 8 so as to engage the recesses with the projections, thereby allowing for prevention of the fixing elastic band 6 from loosing.

When the fixing elastic band 6 is placed on the radially outer surface of the belt-shaped sound absorbing member, the fixing elastic band 6 is preferably coupled by the coupling bands 8 as below.

Figure 11:
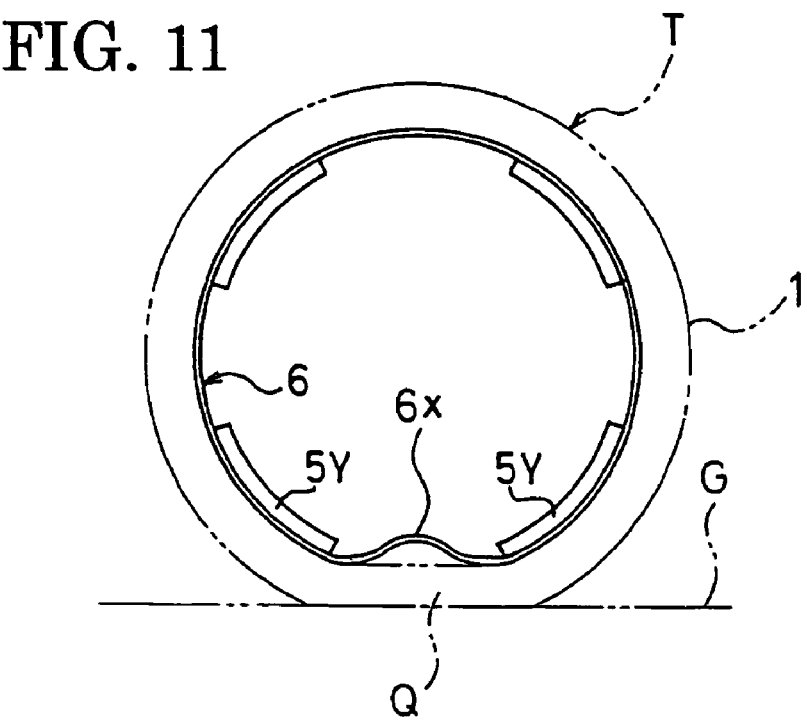
FIG. 11 is a side view illustrating buckling of the fixing elastic band.

The fixing elastic band 6 by which belt-shaped sound absorbing members 5Y have been mounted on a tire T, as shown in FIG. 11, has a fixed circumferential length; therefore, a band portion 6x located at a ground contacting part Q of the tread 1 in contact with a road surface G may be buckled due to the fact that, for example, tires having the same tire size are slightly different in inner circumferential length, and the inner circumferential length of a tire slightly varies when the air pressure of the tire is changed. This buckling increases the strain of the belt-shaped sound absorbing members 5Y, so the fatigue life of the belt-shaped sound absorbing members 5Y may be shortened, or the radially inner surface 1a of the tread 1 may be damaged due to friction between the fixing elastic band 6 and the radially inner surface 1a. In order to prevent such buckling, the fixing elastic band 6 is preferably coupled circularly by the coupling bands 8 so that the circumferential length of the fixing elastic band is 10 mm to 50 mm shorter than the entire circumferential length of the radially inner surface 1a of the tread 1. The circumferential length of the fixing elastic band 6 exceeds the range, it is difficult to effectively prevent buckling. The circumferential length of the fixing elastic band 6 is below the range, the belt-shaped sound absorbing members 5Y can not be properly fitted against the radially inner surface 1a of the tread 1 by the fixing elastic band 6.

The radially inner surfaces 5A2, 5B2 and 5C2 of the belt-shaped sound absorbing members 5A, 5B and 5C are each preferably formed as an uneven surface in order to increase the surface area for enhancement of the absorbing effect thereof. There is no particular limitation to the shape of the uneven surface; the uneven surface may be formed as shown in FIGS. 12 to 16, for example. It is noted that FIGS. 12 to 16 each show a belt-shaped sound absorbing member 5A having a prescribed length that is shorter than the entire circumferential length of the radially inner surface 1a.

Figure 12:
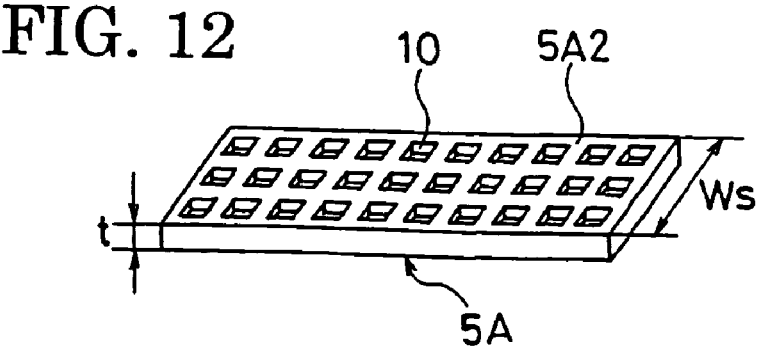
FIG. 12 is a perspective view showing still another example of the belt-shaped sound absorbing member used for a low noise pneumatic tire according to the present invention.
Figure 13:
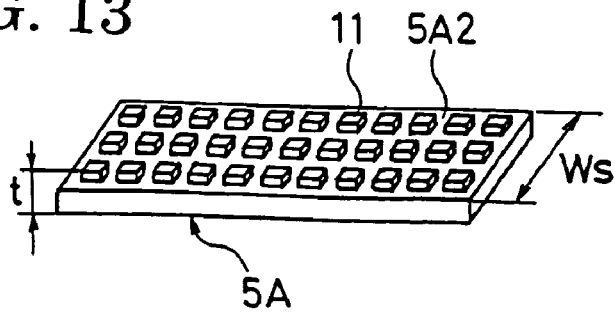
FIG. 13 is a perspective view showing still another example of the belt-shaped sound absorbing member used for a low noise pneumatic tire according to the present invention.

The uneven surface shown in FIG. 12 is formed such that recesses 10 are longitudinally and widthwisely provided at prescribed intervals in the flat radially inner surface 5A2. The uneven surface shown in FIG. 13 is formed such that projections 11 are longitudinally and widthwisely provided at prescribed intervals on the flat radially inner surface 5A2. When the projections 11 are formed as described above, the thickness t of the belt-shaped sound absorbing member 5A is a thickness including the projections 11. The same goes for belt-shaped sound absorbing members 5A explained below.

Figure 14:
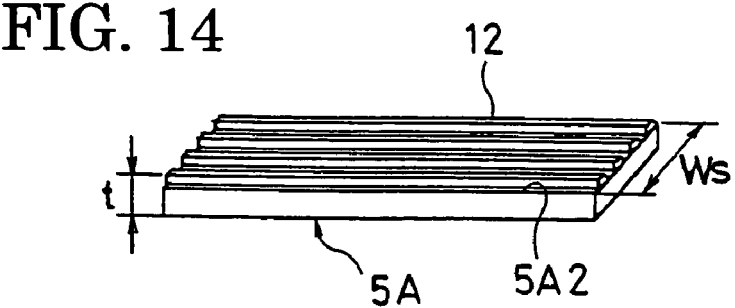
FIG. 14 is a perspective view showing still another example of the belt-shaped sound absorbing member used for a low noise pneumatic tire according to the present invention.
Figure 15:
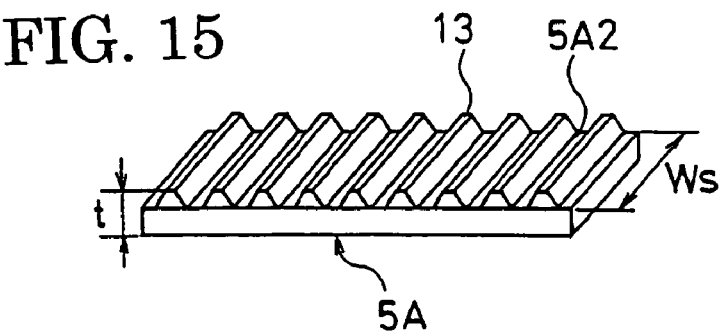
FIG. 15 is a perspective view showing still another example of the belt-shaped sound absorbing member used for a low noise pneumatic tire according to the present invention.
Figure 16:
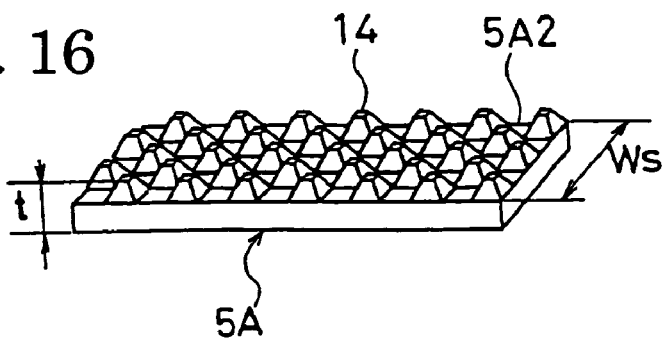
FIG. 16 is a perspective view showing still another example of the belt-shaped sound absorbing member used for a low noise pneumatic tire according to the present invention.

The uneven surface shown in FIG. 14 is formed such that longitudinally extending projections 12 are widthwisely provided at prescribed intervals on the flat radially inner surface 5A2. The uneven surface shown in FIG. 15 is formed such that widthwisely extending projections 13 are longitudinally provided at prescribed intervals on the flat radially inner surface 5A2. The uneven surface shown in FIG. 16 is formed such that projections 14 are longitudinally and widthwisely provided at prescribed intervals on the flat radially inner surface 5A2 and adjacent rows of projections 14 are placed offset to each other.

When the radially inner surface 5A2 has such recesses or projections, the unevenness, that is, the depth of the recesses or the height of the projections is preferably 20 mm or less. If the depth of the recesses or the height of the projections is greater than 20 mm, it is not preferable because processing tasks are troublesome.

In FIGS. 12 to 16, the radially inner surface 5A2 of each belt-shaped sound absorbing member has recesses or projections; however, the flat radially inner surface 5A2 may have recesses and projections.

As described above, the low noise pneumatic tire of the present invention reduces noise created by the tire cavity resonance by mounting the belt-shaped sound absorbing member 5A, 5B, 5C on the radially inner surface 1a of the tread 1 with the fixing elastic band 6; addition of the belt-shaped sound absorbing member 5A, 5B, 5C and fixing elastic band 6 causes the tire T to increase its weight and to be unevenly balanced. Thus, the weight of the belt-shaped sound absorbing member 5A, 5B, 5C and fixing elastic band 6 has to be reduced as much as possible.

However, utilizing such disadvantages, the belt-shaped sound absorbing member 5A, 5B, 5C and fixing elastic band 6 can be used as adjustment members for adjusting weight imbalance of a tire itself. That is, a tire T generally has weight imbalance that cannot be avoided; the weight of a portion of the belt-shaped sound absorbing member 5A, 5B, 5C and/or of a portion of the fixing elastic band 6 located at a part of the tire T that is relatively insufficient in weight in the circumferential direction of the tire T is increased, whereby the belt-shaped sound absorbing member 5A, 5B, 5C and fixing elastic band 6 can be effectively employed also as weight adjustment members.

In the above embodiments, the low noise pneumatic tire of the present invention is structured such that the belt-shaped sound absorbing member 5A, 5B, 5C is mounted on the tire T; however, the low noise pneumatic tire of the present invention may be arranged such that a belt-shaped sound absorbing member having features properly combining the features of the belt-shaped sound absorbing members 5A, 5B and 5C is mounted on the radially inner surface 1a of the tread 1 by the fixing elastic band 6.

EXAMPLE 1

Prepared were four pneumatic tires each according to the present invention tires 1 to 5 and comparison tires 1 to 5, each having a tire size of 205/65R15, the present invention tires 1 to 5 and comparison tires 1 to 4 each having a belt-shaped sound absorbing member shown in FIG. 1 with a width Ws and thickness t as shown in Table 1, the comparison tire 5 having no belt-shaped sound absorbing member.

A urethane foam was used for the belt-shaped sound absorbing member of each test tire. A polypropylene resin was used for each fixing elastic band, the width of the fixing elastic band being 20 mm, the thickness thereof being 1.0 mm.

Evaluation testing for noise characteristics and mountability of the belt-shaped sound absorbing member was conducted on the four test tires according to the following testing method, obtaining the results shown in Table 1.

Noise Characteristics

The four test tires were mounted on wheels each having a rim size of 15×6 1/2JJ, inflated to air pressure of 220 kPa, and mounted on a passenger car of 2500 cc displacement; a microphone was installed on the window side of the driver's side in the car at a position corresponding to that of an ear of the driver. Interior noise in the frequency band of 200 Hz to 300 Hz was measured by the microphone while the passenger car was run on a rough-paved road surface at a speed of 50 km/h; the measurement results were represented by an index where the comparison tire 5 was 100. As the value is smaller, noise characteristics are better. The range that is 85 or below in index is a noticeable improvement level in noise by feeling testing.

Mountabilty of Belt-shaped Sound Absorbing Member

The test car that had finished the noise characteristic testing was run 6000 km; thereafter, the test tires were removed from the test car; visual observations were made on how the belt-shaped sound absorbing member of each test tire was mounted; the observation results were evaluated on a scale of ○ and ×. "○" means that the belt-shaped sound absorbing member is mounted in a good condition without separation or displacement of the belt-shaped sound absorbing member, and there is no damage to the belt-shaped sound absorbing member; "×" means that the belt-shaped sound absorbing member is displaced or damaged.

TABLE 1

| | Width Ws | Thickness (mm) | Noise Characteristics | Mountability |
|---|---|---|---|---|
| Comparison Tire 1 | 0.3 W | 5 | 82 | X |
| Present Invention Tire 1 | 0.4 W | 5 | 77 | ○ |
| Present Invention Tire 2 | 0.7 W | 5 | 75 | ○ |
| Present Invention Tire 3 | 0.9 W | 5 | 73 | ○ |
| Comparison Tire 2 | 0.95 W | 5 | 73 | X |
| Comparison Tire 3 | 0.4 W | 3 | 89 | X |
| Present Invention Tire 4 | 0.4 W | 20 | 70 | ○ |
| Present Invention Tire 5 | 0.4 W | 50 | 65 | ○ |
| Comparison Tire 4 | 0.4 W | 60 | 62 | X |
| Comparison Tire 5 | — | — | 100 | — |

As seen from Table 1, each of the present invention tires can solve a problem with the belt-shaped sound absorbing member mounted thereon while providing a sufficient noise reduction effect.

EXAMPLE 2

Prepared were four pneumatic tires each according to the present invention tires 6 and 7, each having a tire size of 205/65R15, the present invention tire 6 having a belt-shaped sound absorbing member shown in FIG. 2, the present invention tire 7 having a belt-shaped sound absorbing member shown in FIG. 3.

The same materials as in EXAMPLE 1 were used for the belt-shaped sound absorbing member and fixing elastic band of each test tire. The radii S1 and S2 of curvature of the belt-shaped sound absorbing member of the present invention tire 6 was the same as those of the radially inner surface of the tread. The width d of the notches of belt-shaped sound absorbing member of the present invention tire 7 was 30% of the thickness, the intervals thereof being 50 mm.

Evaluation testing for noise characteristics and mountability of the belt-shaped sound absorbing member was conducted on the four test tires as in EXAMPLE 1, obtaining the results shown in Table 2.

TABLE 2

| | Noise Characteristics | Mountability |
|---|---|---|
| Present Invention Tire 6 | 76 | ○ |
| Present Invention Tire 7 | 73 | ○ |

As seen from Table 2, each of the present invention tires can solve a problem with the belt-shaped sound absorbing member mounted thereon while providing a noise reduction effect.

INDUSTRIAL APPLICABILITY

The present invention having the aforementioned excellent effects is very effectively applicable to pneumatic tires to be mounted on vehicles.

What is claimed is:

1. A low noise pneumatic tire having a tread, the tread having a radially inner surface, a belt-shaped sound absorbing member being mounted on the radially inner surface of the tread by an annular fixing elastic band, the belt-shaped sound absorbing member being formed of a porous material and having a width of 40% to 90% of a maximum width of the tire and a thickness of 5 mm to 50 mm,
    whereby the elastic force of the elastic band secures the sound absorbing member on the inner surface of the tread,
    wherein the belt-shaped sound absorbing member has a radially inner surface and a radially outer surface, at least one of the radially inner and outer surfaces of the belt-shaped sound absorbing member has notches that extend widthwisely of the belt-shaped sound absorbing member and are disposed at prescribed intervals longitudinally of the belt-shaped sound absorbing member, and
    wherein one of the radially inner and outer surfaces has the widthwisely extending notches, and the other of the radially inner and outer surfaces has longitudinally extending notches.

2. A low noise pneumatic tire according to claim 1, wherein the belt-shaped sound absorbing member is formed in a curved manner widthwisely and/or longitudinally thereof so as to have a shape extending along the radially inner surface of the tread.

3. A low noise pneumatic tire according to claim 2, wherein the belt-shaped sound absorbing member has a radially outer surface formed in the curved manner with a radius of curvature, the radius of curvature of the radially outer surface being 0.7 to 1.3 times longer than that of the radially inner surface of the tread.

4. A low noise pneumatic tire according to claim 1, wherein the widthwisely extending notches each have a depth of 20% to 90% of the thickness of the belt-shaped sound absorbing member, the intervals of the widthwisely extending notches being 10 mm to 80 mm.

5. A low noise pneumatic tire according to claim 1, wherein the belt-shaped sound absorbing member has a radially inner surface in a form of an uneven surface, the uneven surface being 20 mm or less in unevenness.

6. A low noise pneumatic tire according to claim 1, wherein the fixing elastic band is formed of a synthetic resin, the fixing elastic band being 10 mm to 30 mm in width, and 0.5 mm to 2.0 mm in thickness.

7. A low noise pneumatic tire according to claim 6, wherein the fixing elastic band is formed of a polypropylene resin having flexural modulus of elasticity ranged from 1100 MPa to 1800 MPa.

8. A low noise pneumatic tire according to claim 1, wherein the fixing elastic band is arranged on the inner circumferential side of the belt-shaped sound absorbing member.

9. A low noise pneumatic tire according to claim 1, wherein the fixing elastic band is arranged on the outer circumferential side of the belt-shaped sound absorbing member and fixed on the outer circumferential surface.

10. A low noise pneumatic tire according to claim 1, wherein the fixing elastic band is arranged so as to pass through the inside of the belt-shaped sound absorbing member.

* * * * *